C. H. JOHNSON.
FLYTRAP.
APPLICATION FILED JULY 12, 1918.

1,338,084.

Patented Apr. 27, 1920.
6 SHEETS—SHEET 1.

WITNESS:

INVENTOR:
Charles H Johnson,
BY
ATTORNEY.

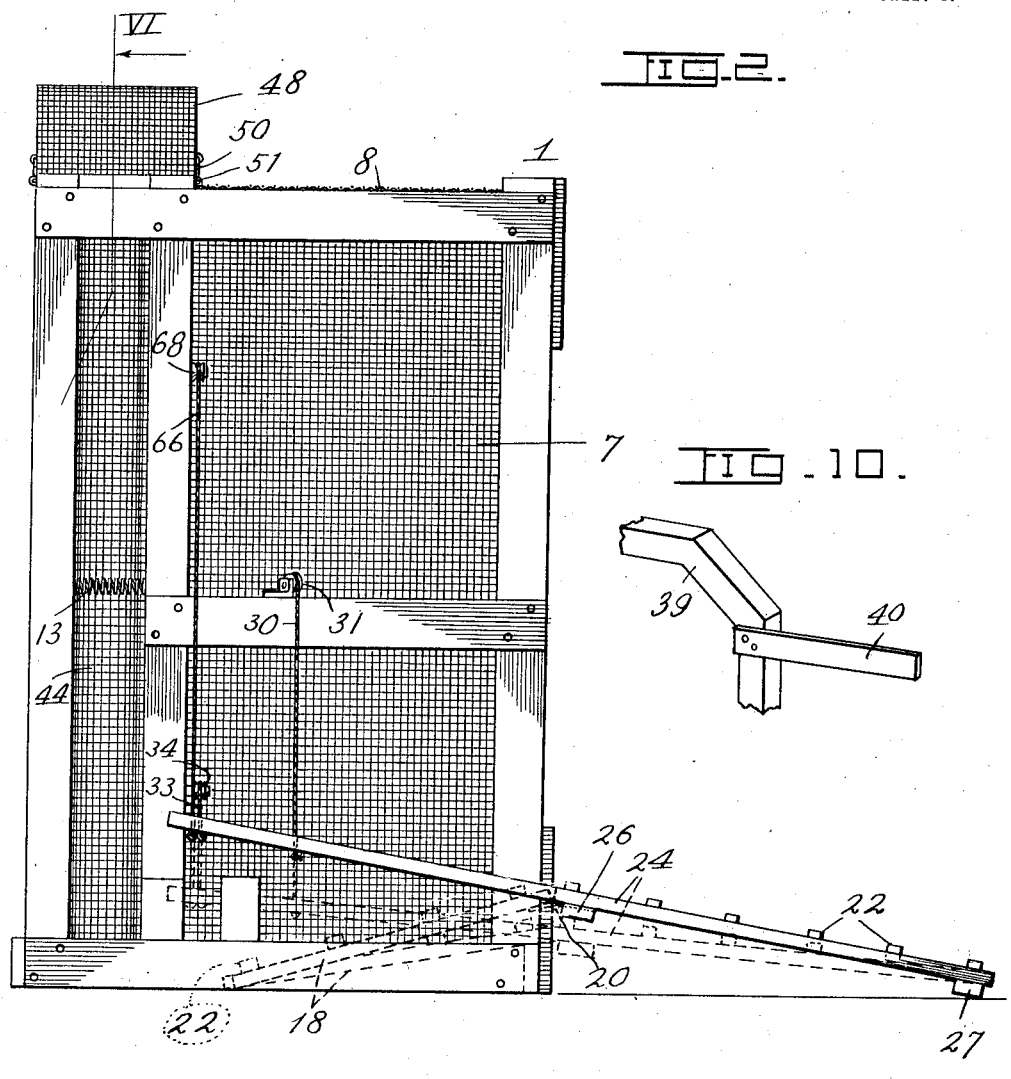

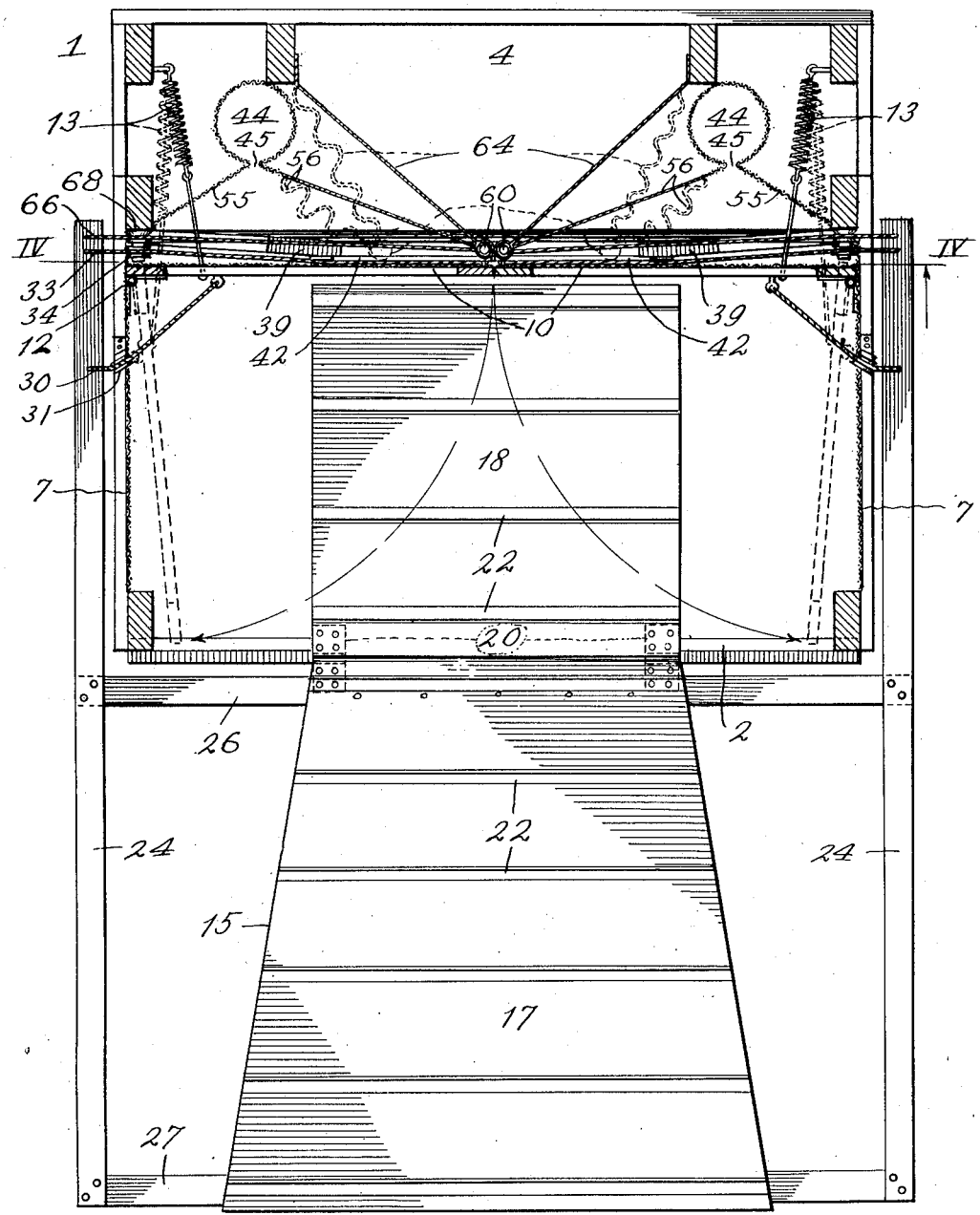

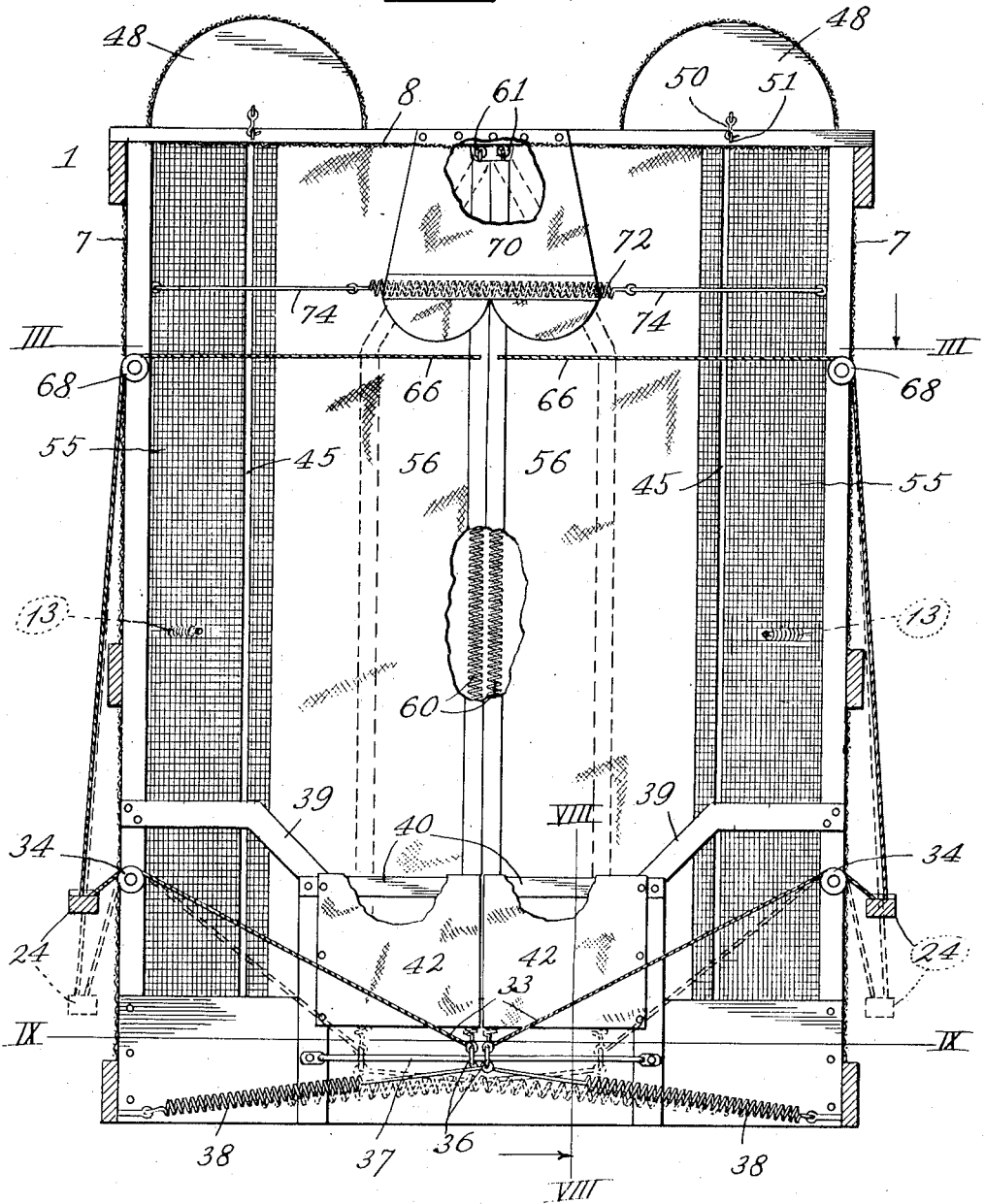

C. H. JOHNSON.
FLYTRAP.
APPLICATION FILED JULY 12, 1918.
1,338,084.
Patented Apr. 27, 1920.
6 SHEETS—SHEET 5.
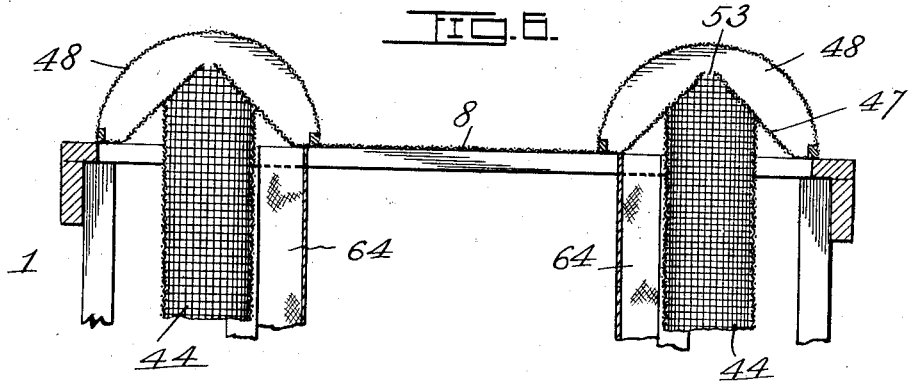
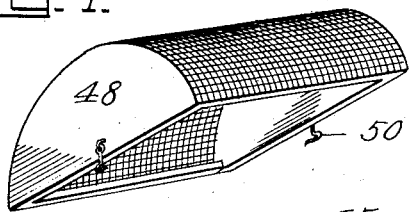
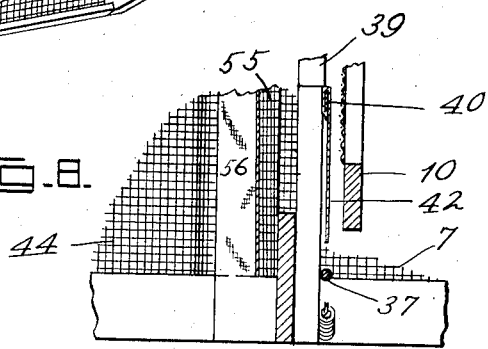
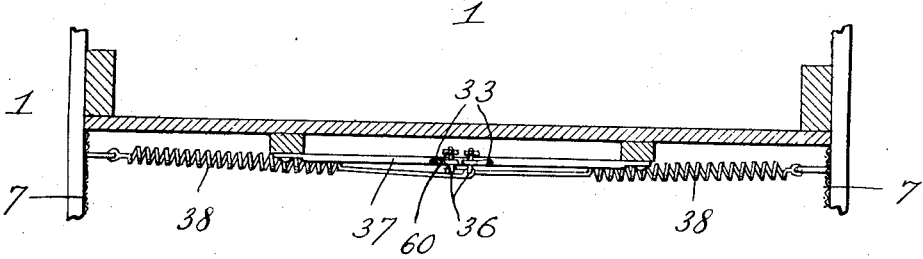
WITNESS:
INVENTOR:
Charles H. Johnson,
BY
F. G. Fischer,
ATTORNEY.

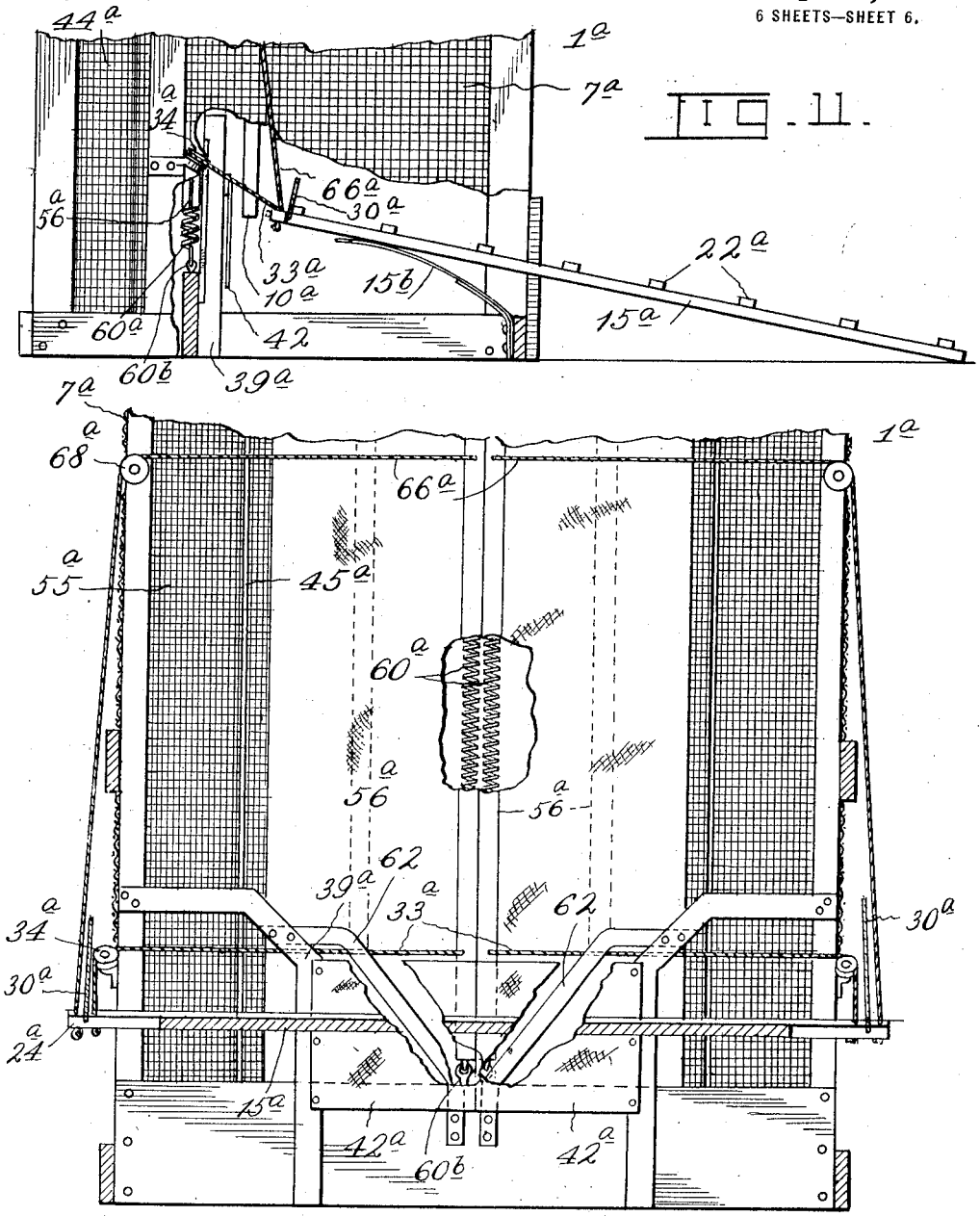

UNITED STATES PATENT OFFICE.

CHARLES H. JOHNSON, OF COLONY, KANSAS.

FLYTRAP.

1,338,084.   Specification of Letters Patent.   Patented Apr. 27, 1920.

Application filed July 12, 1918. Serial No. 244,526.

*To all whom it may concern:*

Be it known that I, CHARLES H. JOHNSON, a citizen of the United States, residing at Colony, in the county of Anderson and State of Kansas, have invented certain new and useful Improvements in Flytraps, of which the following is a specification.

My invention relates to fly traps and pertains more particularly to means for frightening and brushing flies from live stock and entrapping such flies.

A simple, durable and efficient means for driving flies from cattle and other live stock and at the same time entrapping them, has long been needed to thereby lessen the spread of disease and relieve cattle from the annoyances and damage occasioned by flies.

It is a well known fact that cattle, when annoyed by flies, frequently pass through brush or rub against objects to rid themselves of such pests; but such action does not prevent the return of the flies to the animal.

The objects of my invention are to provide such means for driving flies from cattle as will not frighten the flies or cause them to leave the animal until it has passed part way through the device, and to provide an impounder or impounders and means for inducing the flies to enter the same.

The construction of my fly trap is based upon certain known facts respecting the habits, traits and peculiarities of flies. For instance, flies, and especially those known as cattle or horn flies, cling to an animal until it comes in direct touch with parts of the trap. When such flies are driven from the animal they will, if free to do so, follow the animal if they can see light ahead and an apparent avenue of escape.

My device makes it possible for the cattle in passing through it to brush the flies from their bodies and limbs. My device is also designed to prevent the flies from following the animal while it passes through the trap, except in a direction leading to the fly impounder. My device is nearly as light inside as out, and the flies do not hesitate in their attempt to pursue the animal, to pass through the passages to the fly impounder or impounders.

Experience in the use of my device has shown that by placing it in a gateway or other opening through which cattle are accustomed to pass and driving the cattle through it once or twice most of them thereafter voluntarily go through the device whenever bothered by flies.

Some of the important features of my cattle fly trap are as follows:

First; the device is of such construction that the flies are not induced to leave the animal until it has passed part way through the device and reached a point where the flies can be imprisoned. Second; the animal may pass through the device with ease. Third; the opening in the device through which the animal passes is constructed to yield or enlarge, according to the size of the animal entering, in such manner as to contact, approximately, the entire surface of the animal's body and brush or frighten the flies therefrom. Fourth; the device is so constructed that as an animal's rear quarters pass the opening in the fly-removing device, such opening immediately closes, so that the flies cannot pass. Fifth; it is so constructed that while preventing the flies from entering the opening for the animal in the fly removing device, they are induced by the apparent openings ahead to entrap themselves by following the passages which lead to the impounder or impounders.

In order that the invention may be fully understood, reference will now be made to the accompanying drawings, in which:

Fig. 2 is a side elevation of the device.

Fig. 3 is a horizontal section on the plane of line III—III of Fig. 4.

Fig. 4 is a vertical section on line IV—IV of Fig. 3.

Fig. 5 is a side elevation of a treadle employed in carrying out the invention.

Fig. 6 is a broken, sectional view on line VI of Fig. 2.

Fig. 7 is a detail, perspective view of one of the fly-impounder hoods.

Fig. 8 is a fragmentary section on the plane of line VIII—VIII of Fig. 4.

Fig. 9 is a broken, horizontal section on line IX—IX of Fig. 4.

Fig. 10 is a fragmentary view of a support for a fly removing device.

Fig. 11 is a fragmentary side elevation, partly in section, of a modified form of the device.

Fig. 12 is a broken, vertical section on line XII of Fig. 11.

Figure 1:
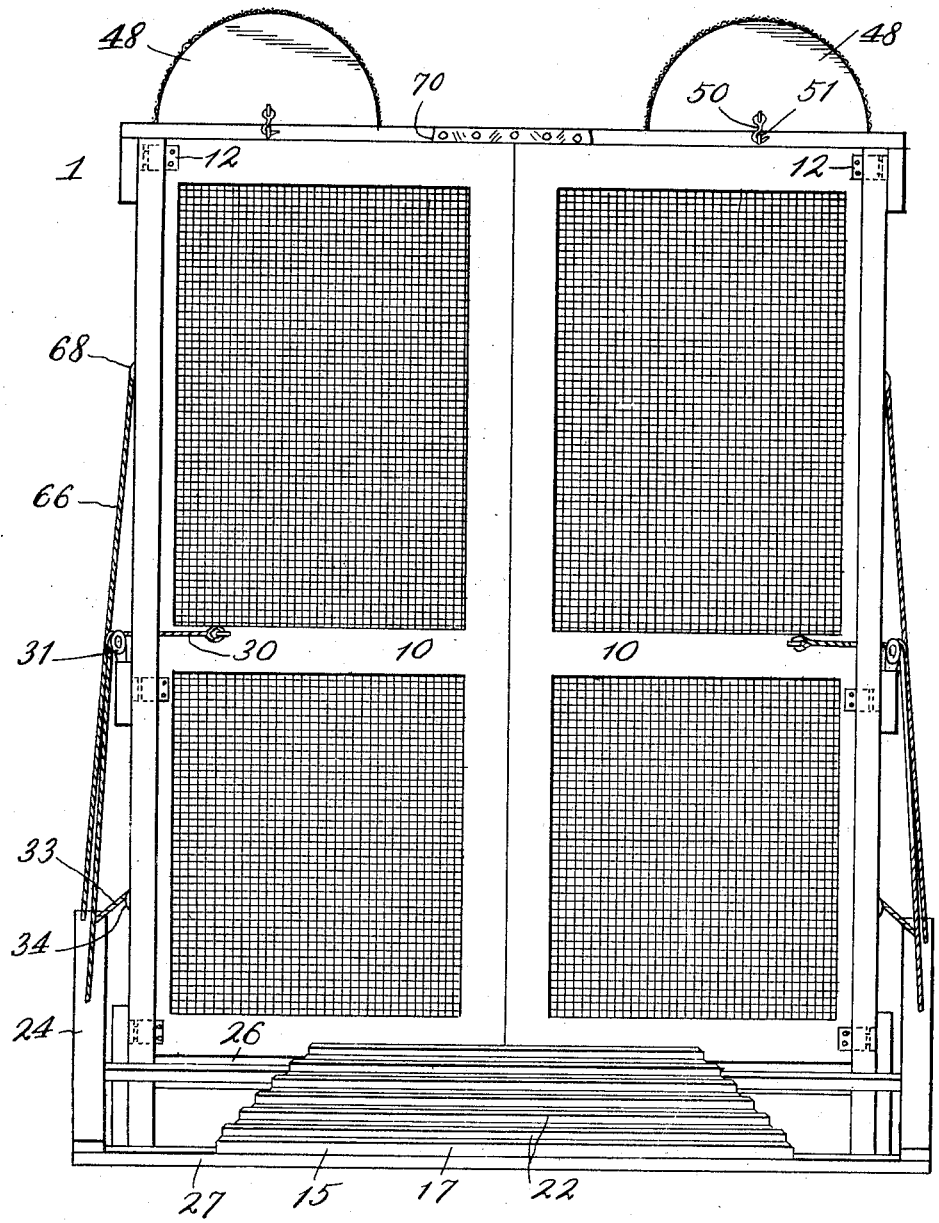
Figure 1 is a front elevation of the device.

In carrying out the invention, I employ a frame 1 open at its entrance 2 and exit 4 as more clearly disclosed by Fig. 3. The sides and top of said frame 1 are partly inclosed by screens 7 and 8, respectively.

10 designates a pair of self-closing screen doors arranged at a point intermediate the entrance 2 and exit 4. Said doors 10 are mounted on hinges 12 secured to opposite sides of the frame 1. A pair of retractile springs 13 secured to the rear portion of the frame 1 and the doors 2 normally hold the latter in closed position and swing them to closed position after they have been opened.

15 designates a treadle for opening the doors 10, so that an animal may pass therethrough. Said treadle 15 extends forwardly through the entrance 2 of the frame 1 and terminates adjacent the doors 10. It consists of members 17 and 18, respectively, operably-connected by hinges 20 and provided at their upper sides with cleats 22 to prevent the cattle from slipping as they pass over the treadle 15.

The hinged portion of the treadle 15 is held in raised position by a pair of levers 24, connected to the member 17 of the treadle by cross bars 26 and 27. Levers 24 incline forwardly and upwardly at opposite sides of the frame 1 and are connected to the doors 10 by cables 30 running upwardly over sheaves 31 mounted on the sides of the frame 1.

The levers 24 also have cables 33 secured thereto. Said cables 33 run over sheaves 34 and are attached at their adjacent ends to rings 36 slidable on a horizontal rod 37 secured at its ends to oppositely-disposed brackets 39, secured to the frame 1, as more clearly disclosed by Fig. 4. The rings are normally held in close relation to each other by coil springs 38, secured to opposite sides of the frame 1.

The brackets 39 are disposed at the rear of the doors 10 and are spaced apart to permit the passage of an animal when said doors are swung to the open position indicated by dotted lines Fig. 3. Flat springs 40 secured to the brackets 39 and extending toward each other carry fly removing devices 42 made, preferably, of fabric or other flexible material.

44 designates a pair of oppositely-disposed, vertically-arranged fly chutes extending from the bottom of the frame 1 to the top thereof and having narrow entrances 45 which extend, substantially, the full length of said chutes. The chutes 44 lead upwardly to the conical bottoms 47 of fly impounders 48, the hoods of which are removably-secured to the upper rear portion of the frame 1 by hooks and eyes 50 and 51, respectively. The apex of each conical bottom 47 has an opening 53 which is large enough to allow the flies to pass one by one into the respective impounders 48.

The flies are directed to the entrances 45 of the chutes 44 by diverging wings 55 and 56. The wings 55 like the chutes 44, are made of wire cloth such as is usually employed for fly screens, but the wings 56 are, preferably, constructed of canvas or other, substantially, opaque material for a purpose which will hereinafter appear. The free sides of the wings 56 are normally held in contact with each other by coil springs 60, which extend upwardly from the rings 36 to eyes 61, secured to the top of the frame 1.

Sheets of fabric 64 are secured to the rear portion of the frame 1 and the free sides of the wings 56 to prevent said wings when closed from exerting undue strain on the chutes 44 and enlarging the entrances 45. Said sheets 64 also coact with the wings 56 in rendering the rear portion of the passageway through which the cattle passes dark, so that the flies will travel toward the chute entrances 45.

The wings 56 are adapted to be drawn apart as indicated by dotted lines, Fig. 4, by the cables 33 and a pair of cables 66 secured at their upper ends to the springs 60 and at their lower ends to the levers 24, to which they are guided by sheaves 68 mounted at opposite sides of the frame 1.

70 designates a fly removing element arranged immediately in front of the upper portion of the wings 56 and depending from the upper portion of the frame 1, Fig. 4. Said fly removing element 70 is, preferably, made of the same material as the fly-removing devices 42 and is normally held taut by a spring 72 extending therethrough and attached at its ends to cables 74 attached at their outer ends to the frame 1.

The operation briefly stated is as follows: As an animal steps upon the treadle 15 its weight depresses said treadle and causes the same to swing the screen doors 10 to open position through the intermediacy of its connections with said screen doors. Depression of the treadle also opens the wings 56 as indicated by the dotted line on Fig. 4, so that the animal in passing over the treadle may pass through the open doors 10 and said opening between the wings 56. As the opening between the wings 56 is less than the width of the animal, it is obvious that the springs 60 will yield and in conforming to the sides of the animal, brush or frighten the flies therefrom. As the animal passes through the opening its legs contact the fly removing devices 42 while its head and back contact the fly removing element 70, so that all flies on these parts are brushed or frightened from the animal. As the flies are unable to follow the animal through the opening, they seeing light through the wings 55 and the chutes 44, endeavor to pass therethrough in their attempt to follow the animal and being unable to pass, follow the wings to the entrances 45 and enter the chutes 44, which as above stated direct them to the impounders 48. As the animal passes off the treadle 15 and through the opening between the wings 56, the latter immediately close as the doors are swung to closed position by the springs 13 and thus imprison all flies which have settled upon the wings 55 and 56. As the springs 13 close the doors 10 and the springs 38 and 60 close the wings 56, said springs 13 and 38 also raise the free ends of the levers 24 and restore the treadle 15 to raised position to be ready for the passage of another animal.

In the modified form disclosed by Figs. 11 and 12, the treadle 15ª, instead of being jointed at its central portion as in the preferred form, is rigid throughout its length to gain more leverage, so that it may be readily depressed by the weight of a calf or a small cow and open the screen doors 10ª and the wings 56ª through the intermediacy of the cables 30ª and 66ª, 33ª, respectively. As disclosed by Fig. 12, the lower cables 33ª run in a horizontal plane from the sheaves 34ª to their points of attachment to the wings 56ª. This arrangement results in a more direct pull on the lower portions of the wings 56ª, than where the cables extend downwardly at an angle, as shown on Fig. 4. In order to prevent the hoofs of animals passing between the wings 56ª from becoming entangled in the cables 33ª, I provide upwardly diverging guards 62 behind which the adjacent ends of said cables 33ª are drawn when the treadle 15ª is depressed. A leaf spring 15ᵇ secured to the lower portion of the frame 1ª and bearing at its free end against the underside of the treadle 15ª, serves to restore the same to raised position after an animal has passed thereover. In other respects the modified form is, substantially, the same as the preferred form, as indicated by corresponding reference numerals with exponents.

From the foregoing description it is apparent that I have produced a fly trap embodying all of the features above enumerated, and while I have shown and described the preferred form and one modified form of my invention, I reserve the right to make such changes in the construction, combination and arrangement of parts as properly fall within the spirit and scope of the claims.

Having thus described my invention, what I claim and desire to secure by Letters Patent, is:

1. In a device of the character described, a passageway for animals, wings of comparatively opaque material disposed within said passageway and adapted to remove flies from each animal passing between said wings, wings of foraminous material arranged opposite the first-mentioned wings, doors for imprisoning the flies on the wings, means controlled by the animals for opening said doors, chutes communicating with said wings, and fly impounding means communicating with said chutes.

2. In a device of the character described, a passageway for animals, wings of comparatively opaque material disposed within said passageway and adapted to remove flies from each animal passing between said wings, wings of foraminous material arranged opposite the first-mentioned wings, means controlled by the animals for opening the first wings, means for closing said first wings after the passage of each animal, chutes communicating with the first and second wings, and fly impounding means communicating with said chutes.

3. In a device of the character described, a passageway for animals, wings of comparatively opaque material disposed within said passageway and adapted to remove flies from each animal passing between said wings, wings of foraminous material arranged opposite the first-mentioned wings, doors for imprisoning the flies on the wings, chutes communicating with said wings, fly impounding means communicating with said chutes, a treadle depressed by the animal as it approaches said doors, and means connecting said treadle with the doors whereby the latter are opened as the treadle is depressed.

4. In a device of the character described, a passageway for animals, wings of comparatively opaque material disposed within said passageway and adapted to remove flies from each animal passing between said wings, wings of foraminous material arranged opposite the first-mentioned wings, doors for imprisoning the flies on the wings, chutes communicating with said wings, fly impounding means communicating with said chutes, a treadle depressed by the animal as it approaches said doors, means connecting said treadle with the doors whereby the latter are opened as the treadle is depressed, and means for closing the doors and lifting the treadle to normal position.

5. In a device of the character described, a passage for animals, means in said passageway for removing flies from the animals passing therethrough, a fly removing element suspended from the upper portion of said passageway to remove flies from the backs of animals passing through the passageway, and resilient means extending through the lower portion of said element and secured to opposite sides of the device, for the purpose described.

In testimony whereof I affix my signature, in the presence of two witnesses.

CHARLES H. JOHNSON.

Witnesses:
F. G. FISCHER,
L. J. FISCHER.